(12) United States Patent
Hadano et al.

(10) Patent No.: US 6,474,631 B2
(45) Date of Patent: Nov. 5, 2002

(54) STABILIZER BUSHING

(75) Inventors: Katsuya Hadano; Hideyuki Imai; Takaaki Ando; Hiroshi Yokoi, all of Nishikasugai-gun (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/809,031

(22) Filed: Mar. 16, 2001

(65) Prior Publication Data
US 2001/0045694 A1 Nov. 29, 2001

(30) Foreign Application Priority Data

Mar. 16, 2000 (JP) ........................................ 2000-073651
Jul. 14, 2000 (JP) ........................................ 2000-215001

(51) Int. Cl.$^7$ ................................................ F16F 1/14
(52) U.S. Cl. ...................... 267/276; 267/33; 267/140.3; 267/141; 267/153
(58) Field of Search ................................ 267/33, 140.3, 267/141, 153, 167, 170, 179, 189, 200, 219–221, 248, 276, 286, 281, 292; 384/125, 907, 297; 428/465

(56) References Cited

U.S. PATENT DOCUMENTS

| | | | |
|---|---|---|---|
| 4,854,766 A | * 8/1989 | Hein ............................ | 403/224 |
| 4,880,318 A | * 11/1989 | Shibahara et al. ........... | 384/125 |
| 5,224,790 A | * 7/1993 | Hein ........................ | 267/140.3 |
| 5,286,014 A | * 2/1994 | Chakko ................... | 267/141.2 |
| 5,290,018 A | * 3/1994 | Watanabe et al. ......... | 267/141.3 |
| 5,518,819 A | * 5/1996 | Shibahara et al. ....... | 174/152 R |
| 5,565,251 A | * 10/1996 | Tang et al. ............... | 267/141.2 |
| 5,984,283 A | 11/1999 | Tsuiki et al. ................... | 267/33 |

FOREIGN PATENT DOCUMENTS

| | | |
|---|---|---|
| JP | 60-180619 | 11/1985 |
| JP | 63-57310 A | 3/1988 |
| JP | 63-57311 A | 3/1988 |
| JP | 10-082441 | 3/1998 |

OTHER PUBLICATIONS

Japanese Industrial Standard JIS K 6300.
Japanese Industrial Standard JIS K 6301.

* cited by examiner

Primary Examiner—Ram Rodriguez
(74) Attorney, Agent, or Firm—Pillsbury Winthrop LLP

(57) ABSTRACT

A cylindrical rubber elastic member for having a stabilizer bar inserted therein comprises an inner layer rubber with high sliding properties and an outer layer rubber provided outside of the inner layer rubber. Both the stability in operation and the riding comfort can be improved. Further, the rubber elastic member comprises a sliding surface made of a rubber with high sliding properties at the end face thereof. Frictional resistance can be lowered to prevent abnormal noise. A stabilizer bushing comprising a main body rubber portion of a sulfur-vulcanizable first rubber compound and a sliding rubber portion of a second rubber compound containing a sulfur-vulcanizable lubricant on the inner surface of the main body rubber portion, wherein the first rubber compound exhibits vulcanizability satisfying:

$t_{90} - t_{50}$ $\geq 1.5$ min and contains a crosslinking tackifier, $t_{90}$ is a time to 90% vulcanization, $t_{50}$ is a time to 50% vulcanization, and the vulcanizability is measured by a curastometer in accordance with JIS K 6300.

12 Claims, 9 Drawing Sheets

STABILIZER BUSHING

BACKGROUND OF THE INVENTION

1. Field of the Invention

The present invention relates to a vehicle stabilizer bushing entirely made of rubber having a sliding surface on the inner side thereof particularly suitable for mounting a stabilizer bar in automobile suspension on the vehicle body or suspension. The present invention can be applied also to a rubber laminate having a sliding rubber portion other than stabilizer bushing.

The present application is based on Japanese Patent Applications No. 2000-73651 and No. 2000-215001, which are incorporated herein by reference.

2. Description of the Related Art

A conventional vehicle stabilizer bushing 112 has a structure as shown in FIG. 10 (see JP-A-60-180619 (The term "JP-A" as used herein means an "unexamined published Japanese patent application")).

A rubber elastic member 10 constituting the stabilizer bushing 112 is essentially a cylindrical material surrounded by an inner surface 114 and an outer surface 16 (formed by a U-shaped surface 16a and a flat surface 16b closing the upper opening thereof). The cylindrical material is provided with a flange portion 101 at the both axial ends of the U-shaped surface 16a and a cut 120 for allowing a stabilizer bar S to be inserted thereinto. The vehicle stabilizer bar S is inserted into and retained by the thick cylindrical rubber elastic member 10.

In order to mount the bushing 112 on the vehicle body, the bushing 112 is fitted on the stabilizer bar S through the cut 120, and then mounted on the vehicle body with a bracket 20. In some detail, the both mounting seats 20b of the U-shaped retaining portion are screwed to the vehicle body (not shown) through a hole 201 with the U-shaped surface of the bushing 112 being retained by the bracket 20 at its U-shaped retaining portion 20a.

The radially protruding flange 101 provided at both axial ends of the rubber elastic member 10 prevents the rubber elastic member 10 from coming off from the bracket 20.

It has been found that when the torsional torque developed upon the reception of torsion of the stabilizer bar S retained by the bushing 12 is reduced, it has an effect on the riding comfort. A known technique for reducing torsional torque of the stabilizer bar S is a bushing having an inner surface formed by a resin layer having high sliding properties (low friction coefficient) (JP-A-63-57310, JP-A-63-57311, etc.).

However, the bushing having an inner surface formed by a resin layer is disadvantageous in that the elastic modulus (spring constant) of the entire bushing can hardly be lowered than a predetermined value since the resin material has a high elastic modulus (spring constant) than the rubber material. On the other hand, in the case a soft rubber material is used as the rubber portion of the bushing so as to derive an elastic modulus (spring constant) of the entire bushing lower than a predetermined value, the resulting bushing has a deteriorated durability.

In order to cope with the foregoing problems, JP-A-10-82441 proposes a bushing 112a arranged such that a sliding rubber portion (rubber with high sliding properties) 10a which comes in contact with the stabilizer bar S is formed on the inner surface of a main body rubber portion (base rubber) 10b constituting the outer surface as shown in FIG. 12.

Further, a stabilizer bushing comprising a rubber elastic member 10 consisting of two layers, namely, inner layer rubber 10a made of a rubber material having high sliding properties and outer layer rubber 10b as shown in FIG. 11 has recently been studied. The structure of stabilizer bushing shown in FIG. 10 is disadvantageous in that the desired stability in operation and riding comfort can hardly be attained at the same time, that is, when the rigidity of the rubber elastic member 10 is raised to enhance the stability in operation, the riding comfort is deteriorated while when the rubber elastic member 10 is made of a softer material, the stability in operation is deteriorated. Meanwhile, the structure of FIG. 11 is advantageous in that the riding comfort is raised since the sliding resistance of the inner layer rubber 10a is low, as well as in that the stability in operation is improved since the outer layer rubber 10b can be made of a rubber material having a higher rigidity than that of the inner layer rubber 10a to enhance the rigidity of the rubber elastic member 10. Further, the generation of abnormal noise due to rapid relative displacement between the inner layer rubber 10a and the stabilizer bar S can be prevented.

However, the most modern design of vehicles requires that components be received in as small area as possible. Thus, there is no sufficient space between the components. Therefore, when the stabilizer bar S makes an axial relative movement with respect to the rubber elastic member 10 to show a horizontal shift, the stabilizer bar S can interfere with its surrounding components. In order to cope with this problem, a horizontal shift stopper 2 made of metal ring is provided around the stabilizer bar S as shown in FIG. 11 to control the relative movement. However, a new problem has arisen that the horizontal shift stopper 2 and the rubber elastic member 10 generate abnormal noise by an interference with each other.

Besides, the bushing 112a having the foregoing structure is normally prepared by using an injection mold as shown in FIG. 13.

In some detail, the main body rubber portion 10b is prepared by injection-molding a rubber material for main body rubber portion (first rubber compound) which has been injected through a first material injection passage 34 in a cavity for main body rubber portion 32 formed by a first top force 28 and a bottom force 30. When the vulcanization of the main body rubber portion 10b has proceeded to a certain extent, the first top force 28 is then replaced by a second top force 36. A rubber material for sliding rubber portion (second rubber compound) is then injected into a cavity for sliding rubber portion 38 formed inside the main body rubber portion 10b through a second material injection passage 40 so that it is injection-molded. When the vulcanization of the main body rubber portion 10b as well as the sliding rubber portion 10a has been completed, the mold is then opened to release the bushing (molded product)

It was found that if the vulcanization of the main body rubber portion 10b proceeds too much (e.g., 90% vulcanization) at the time the second rubber compound is injected, there cannot be made a sufficient vulcanized bonding (co-crosslinking: by simultaneous vulcanization) between the main body rubber portion 10b and the sliding rubber portion 10a. The term "co-crosslinking (co-vulcanization)" as used herein is meant to indicate crosslinking between different rubber phases. The term "co-crosslinking agent" as used herein is meant to indicate a vulcanizing agent to be added for the purpose of improving the foregoing "co-crosslinkability".

If the time of injection of the second rubber compound is predetermined to be sooner from that of the first rubber compound (50% vulcanization), a sufficient vulcanized bonding strength can be attained. However, the main body rubber portion 10b is insufficiently vulcanized, reducing stability in shape of the main body rubber portion 10b. Thus, this approach is not practical. In other words, the injection pressure of the material for sliding rubber portion may cause the main body rubber portion 10b to be compressed or the raw material for sliding rubber portion to penetrate into interfaces between the main body rubber portion 10b and the forces 30, 36, generating defects in shape of the molded product.

SUMMARY OF THE INVENTION

It is an object of the present invention to provide a stabilizer bushing having a horizontal shift stopper provided thereon which can prevent the generation of abnormal noise due to the interference with the horizontal shift stopper without impairing the stability in operation or riding comfort.

It is another object of the present invention to provide a stabilizer bushing which allows vulcanized bonding of the sliding rubber portion to the main body rubber portion even if the sliding rubber portion material is injected when the vulcanization of the main body rubber portion is almost completed (90% or more vulcanization) and a process for the preparation thereof.

In accordance with the first aspect of the invention, a stabilizer bushing is provided comprising a stabilizer bar inserted in a cylindrically-formed rubber elastic member the outer surface of which is arranged to be retained by a bracket to be fixed to the vehicle body. Around the stabilizer bar is provided a stopper member for controlling the axial movement of the rubber elastic member. The rubber elastic member has a laminated structure comprising an inner layer rubber made of a rubber with-high sliding properties and an outer layer rubber laminated on the outer surface of the inner layer rubber. The rubber elastic member has a sliding surface made of a rubber with high sliding properties provided at least on the end face thereof facing the stopper member.

In accordance with the foregoing arrangement, the rubber elastic member has a sliding surface made of a rubber with high sliding properties and a reduced frictional resistance provided on the end face thereof facing the stopper member, making it possible to prevent the generation of abnormal noise even when the stabilizer bar makes horizontal shift to cause the rubber elastic member to interfere with the stopper member. Further, since the rubber elastic member has a laminated structure comprising a stabilizer bar-retaining inner layer made of a rubber with high sliding properties, the desired stability in operation and riding comfort can be attained at the same time, and the generation of abnormal noise due to interference with the stopper can be prevented, making it possible to realize a comfortable environment.

In accordance with the second aspect of the invention, the area of the sliding surface is predetermined to be equal to or more than that of the end face of the stopper member. In this arrangement, the outer layer rubber made of an ordinary rubber material and the stopper member can be prevented from interfering with each other, making it possible to prevent the generation of abnormal noise more securely.

In accordance with the third aspect of the invention, the sliding surface can be arranged to protrude beyond the end face of the outer layer rubber toward the stopper member. In this arrangement, too, the outer layer rubber and the stopper member can be prevented from interfering with each other, eliminating the necessity of making the area of the sliding surface greater than that of the stopper member and hence enhancing the degree of freedom of design.

In accordance with the fourth aspect of the invention, the sliding surface is provided integrally with the inner layer rubber. In this arrangement, the sliding surface can be molded integrally with the inner layer rubber during the molding of the inner layer rubber, making it easy to prepare the stabilizer bushing.

In accordance with the fifth aspect of the invention, the rubber elastic member comprises a pair of radially extending flange portions provided on the respective end face thereof, and the entire end faces of the rubber elastic member including the flange portion are made of a rubber with high sliding properties formed integrally with the inner layer rubber. In this arrangement, the outer layer rubber can be held interposed between the flange portions, making it possible to prevent the inner layer and the outer layer from shifting with respect to each other or coming off from each other.

In accordance with the sixth aspect of the invention, the hardness of the outer layer rubber is predetermined to be equal to or more than that of the inner layer rubber. By thus raising the hardness of the outer layer rubber, a necessary rigidity can be secured, making it possible to enhance the stability in operation.

In accordance with the seventh aspect of the invention, the external shape of the inner layer rubber is polygon or analogous to that of the outer layer rubber. In this arrangement, shift or rotation on the interface of the inner layer with the outer layer can be prevented, improving the adhesivity. The external shape of the inner layer rubber analogous to that of the outer layer is effective for the increase of the volume of the inner layer rubber.

In accordance with the eighth aspect of the invention, the foregoing objects can be accomplished with the following constitution.

A stabilizer bushing comprising a main body rubber portion formed of a sulfur-vulcanizable first rubber compound and a sliding rubber portion formed of a second rubber compound containing a sulfur-vulcanizable lubricant on the inner surface of the main body rubber portion, characterized in that the first rubber compound exhibits vulcanizability satisfying the following requirements:

$$t_{90}t_{50}$$

$$\geq 1.5 \text{ min}$$

and contains a crosslinking tackifier, $t_{90}$ is a time to 90 vulcanization, $t_{50}$ is a time to 50 vulcanization, and the vulcanizability is measured by a curastometer in accordance with JIS K 6300. In this arrangement, a sufficient adhesive strength of the sliding rubber portion with respect to the main body rubber portion can be secured even if the molding of the sliding rubber portion is effected after the passage of $t_{90}$ of the main body rubber portion as shown in the testing examples described later.

The reason why the prolongation of $(t_{90}-t_{50})$ provides improvement of vulcanized adhesivity to vulcanized rubber is unknown. That is because it has been a common sense to those skilled in the art that the adhesivity strength of unvulcanized rubber with respect to vulcanized rubber of the same kind depends little on the vulcanization history of vulcanized rubber. Further, it is not known to those skilled in the art that the incorporation of an tackifier in a main body rubber portion causes a drastic increase of vulcanized adhesive strength (90° peeling strength). In other words, an tackifier is inherently incorporated to improve the knead ability (adhesivity to roll) of rubber during kneading and the adhesivity of dough. The tackifier thus incorporated is mostly retained in the crosslinked structure (vulcanized network) and is a low molecular compound having low Tg (glass transition point). It was thus a common sense to those skilled in the art that an tackifier makes little contributions to the increase of vulcanized adhesive strength in an atmosphere of softening temperature (e.g., 80° C. in the testing examples described later).

As the crosslinking tackifier there is preferably used a phenol-formaldehyde resin or phenol-polysulfide resin. Since a phenol-formaldehyde resin is used also as a crosslinking agent for diene-based rubber, it can be presumed that a phenol-formaldehyde resin acts as a co-crosslinking agent on the interface of the main body rubber portion with the sliding rubber portion. Further since the release of sulfur from a phenol-polysulfide resin is suppressed until shortly before the completion of vulcanization, it can be presumed that a phenol-polysulfide resin, too, acts as a co-crosslinking agent.

In the case where an NR-based rubber is used as a rubber polymer for the first rubber compound, an alkylphenol polysulfide (tackifier) is used as the phenol-polysulfide resin. The amount of the alkylphenol polysulfide to be incorporated is normally from 0.25 to 5 phr.

As the phenol to be used as a base there is used an alkylphenol from the standpoint of compatibility with NR-based rubber. When the amount of the tackifier to be incorporated is too small, the desired vulcanized adhesive strength of the sliding rubber portion with respect to the main body rubber portion after the passage of $T_{90}$ can hardly be obtained. On the contrary, when the amount of the tackifier to be incorporated is too great, the vulcanized adhesive strength (rubber strength) is rather reduced and the permanent compression set of the rubber is adversely affected.

In the case where the rubber polymer to be used as the first rubber compound and second rubber compound in the foregoing various arrangements is an NR-based rubber, the vulcanization accelerator to be incorporated in the first rubber compound is normally a benzothiazole sulfide compound. This is because the use of such a vulcanization accelerator enables to control easily the vulcanization curve.

The constitution of the process for the preparation of the stabilizer bushing for vehicle of the invention is as follows.

A process for the preparation of a stabilizer bushing which comprises forming a main body rubber portion from a sulfur-vulcanizable first rubber compound, forming a sliding rubber portion from a sulfur-vulcanizable second rubber compound on the inner surface of the main body rubber portion, and then allowing the sliding rubber portion to be co-crosslinked to the main body rubber, characterized in that as the first rubber compound there is used one having vulcanizability satisfying the following requirements:

$t_{90}t_{50}$ $\geq 1.5$ min and containing a crosslinking tackifier, $t_{90}$ is a time to 90% vulcanization, $t_{50}$ is a time to 50% vulcanization, and the vulcanizability is measured by a curastometer in accordance with JIS K 6300.

BRIEF DESCRIPTION OF THE DRAWINGS

FIGS. 1A through 1D illustrate a first embodiment of implication of the present invention wherein FIG. 1A is a diagram illustrating how a stabilizer bushing is mounted on a stabilizer bar and is a sectional view taken on the line I—I of FIG. 1B, FIG. 1B is a front view of the stabilizer bushing as viewed in the axial direction, FIG. 1C is a sectional view taken on the line II—II of FIG. 1B, and FIG. 1D is a sectional view taken on the line III—III of FIG. 1D;

FIGS. 2A through 2C illustrate a second embodiment of implication of the present invention wherein FIG. 2A is a front view of the stabilizer bushing as viewed in the axial direction, FIG. 2B is a sectional view of the stabilizer bushing taken on the axial line and FIG. 2C is a sectional view taken on the line IV—IV of FIG. 2B;

FIGS. 3A and 3B illustrate a third embodiment of implication of the present invention wherein FIG. 3A is a front view of the stabilizer bushing as viewed in the axial direction and FIG. 3B is a sectional view of the stabilizer bushing taken on the axial line;

FIGS. 4A through 4D illustrate a fourth embodiment of implication of the present invention wherein FIG. 4A is a sectional view of a stabilizer bushing comprising a horizontal shift stopper provided thereon taken on the axial line, FIG. 4B is a front view of the stabilizer bushing comprising a horizontal shift stopper provided thereon as viewed in the axial direction, FIG. 4C is a front view of the stabilizer bushing as viewed in the axial direction, and FIG. 4D is a sectional view taken on the line V—V of FIG. 4A;

DETAILED DESCRIPTION OF THE PREFERRED EMBODIMENTS

Figure 1A:
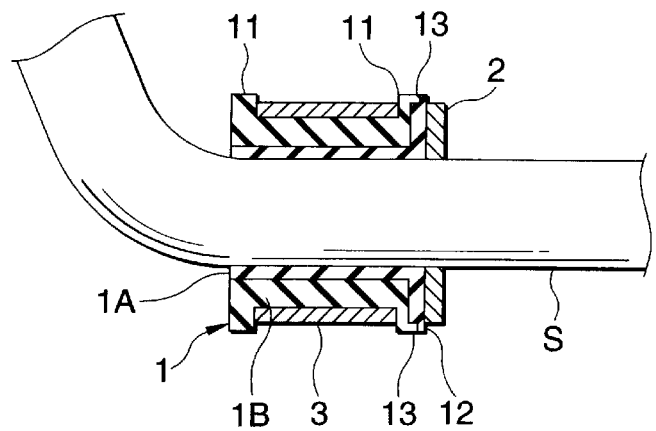

A first embodiment of the present invention will be described in connection with the attached drawings. FIG. 1A indicates how a stabilizer bushing is mounted on a stabilizer S. In FIG. 1A, a thick cylindrical rubber elastic member 1 constituting the stabilizer bushing comprises an inner layer rubber 1A made of a rubber with high sliding properties and an outer layer rubber 1B provided around the inner layer rubber 1A. The rubber elastic member 1 has a radially extending flange portion 11 provided at the both end faces thereof. The rubber elastic member 1 is retained at the outer surface thereof between these flange portions 11 by a substantially U-shaped bracket 3 which is to be fastened to the vehicle frame with a bolt.

Figure 1B:
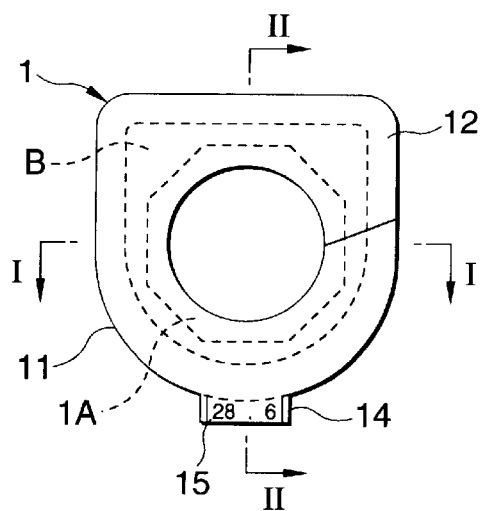
Figure 1C:
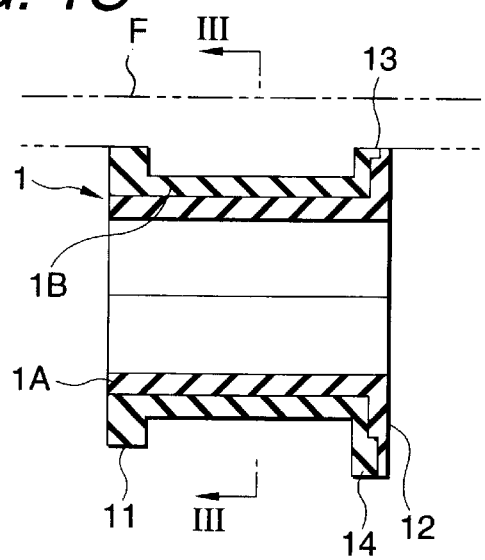
Figure 1D:
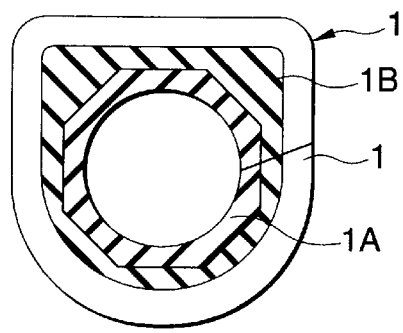

FIGS. 1B to 1D are diagrams illustrating the detailed structure of the rubber elastic member 1. As shown in FIG. 1C, the rubber elastic member 1 has a two-layer structure comprising a cylindrical inner layer rubber 1A inserted in the stabilizer S and an outer layer rubber 1B formed laminated on the outer surface of the inner layer rubber 1A. The external shape of the inner layer rubber 1A is a polygon such as octagon as shown in 1D. In this arrangement, shift or rotation on the interface of the inner layer rubber 1A with the outer layer rubber 1B can be prevented, enhancing the adhesivity.

The outer layer rubber 1B has a U-shaped external shape and a flat top surface. The outer layer rubber 1B has an external edge radially extending at a constant length at the both ends thereof to form the foregoing flange portions 1. As shown in FIG. 1C, the surface of the vehicle frame F with which the rubber elastic member 1 comes in contact when the stabilizer bushing is mounted on the vehicle frame F has a protrusion having a shape corresponding to that of the top surface of the outer layer rubber 1B. In this arrangement, the axial movement of the rubber elastic member 1 can be regulated to prevent the shift of the rubber elastic member 1 from the bracket 3.

In FIGS. 1A to 1D, to the periphery of the stabilizer bar S is fixed a horizontal shift stopper 2 as a stopper member on one side of the rubber elastic member 1 (right as viewed on FIG. 1A). The horizontal shift stopper 2 is annular and made of a metal or rubber. When the stabilizer bar S makes a horizontal shift with respect to the rubber elastic member 1, the horizontal shift stopper 2 comes in contact with the rubber elastic member to regulate the movement of the rubber elastic member, preventing the interference of the stabilizer bar S with its surrounding components.

In the present embodiment, the rubber elastic member 1 comprises a sliding surface 12 made of a rubber with high sliding properties provided integrally with the inner layer rubber 1A on the end face thereof facing the horizontal shift stopper 2. The area of the sliding surface 12 is preferably greater than that of the horizontal shift stopper 2. In the present embodiment, the entire surface of the right end face (front surface as shown on FIG. 1B) of the rubber elastic member 1 is the sliding surface 12 as shown in FIG. 2B. The thickness of the sliding surface 12 is almost half that of the flange portion 11 (normally about 3 mm). The thickness of the sliding surface 12 at the peripheral edge thereof is about 1 mm, and the back side of the peripheral edge of the sliding surface 12 is supported by a thin rib 13 protruding from the peripheral edge of the end face of the outer layer rubber 1B. The provision of the protruding thin rib 13 on the peripheral edge of the end face of the outer layer rubber 1B has an effect of preventing the protrusion of the rubber with high sliding properties during molding. In other words, the rubber with high sliding properties can be prevented from coming in contact with the bracket 3, making it possible to prevent the deterioration of the retention of the bracket 3.

As shown in FIGS. 1B and 1C, the rubber elastic member 1 comprises a rectangular identification rib 14 provided at the lower end of the flange portion 11 on the sliding surface 12 side thereof. The surface of the identification rib 14 is covered by a rubber with high sliding properties to be integrated with the sliding surface 12. The arrangement of the identification rib 14 makes it easy to identify the direction of the rubber elastic member 1, namely, end face of the sliding surface 12 and hence facilitates the mounting of the stabilizer bushing on the stabilizer bar S. The provision of an identification marking 15 for identification of the diameter of insert hole for the stabilizer bar S on the surface of the identification rib 14 makes it possible to identify rubber elastic members 1 having different hole diameters to be formed merely by changing the top force for inner layer rubber 1A. This makes it possible to reduce the cost of production of mold. Further, since the identification marking 15 is in a position where no interference with the horizontal shift stopper 2 is occured, it has no effect on the characteristics of the stabilizer bushing.

The various constitutions will be further described with reference to other aspects of the invention.

(1) The bushing of the invention comprises a main body rubber portion made of a sulfur-vulcanizable first rubber compound and a sliding rubber portion formed of a second rubber compound containing a sulfur-vulcanizable lubricant on the inner side of the main body rubber portion.

The term "main body rubber portion" as used herein is meant to indicate the foregoing outer layer rubber. The term "sliding rubber portion" as used herein is meant to indicate the foregoing inner layer rubber.

The reason why such a sulfur-vulcanizable rubber is used is that such a sulfur-vulcanizable rubber can easily provide a vulcanized product having excellent mechanical properties such as tensile strength, tear strength, elongation and bending properties as compared with other general-purpose vulcanizable rubbers such as peroxide-vulcanizable rubber. This is also because peroxide-vulcanizable rubbers provide a low crosslinking efficiency as compared with NR-based rubber, which is preferably used as a rubber polymer.

The rubber polymer to be used as the first rubber compound or second rubber compound is not specifically limited so far as it has desired mechanical strength, hardness and vibration absorption properties and is sulfur-vulcanizable. Specific examples of the rubber polymer employable herein include natural rubber (NR), butadiene rubber (BR), isoprene rubber (IR), styrenebutadiene rubber (SBR), chloroprene rubber (CR), nitrile rubber (NBR), ethylenepropylene-diene copolymer rubber (EPDM), butyl rubber (IIR), chlorinated butyl rubber (Cl-IIR), and blended rubber thereof. Preferred among these rubbers are NR, which is excellent in mechanical strength, abrasion resistance and rubber elasticity (vibration absorption properties), and NR blended with a nonpolar diene rubber (SBR, IR, BR, etc.) having a good compatibility.

In the case where a blended rubber is used, as the rubber polymer to be used as the first rubber compound (for main body rubber portion) there is preferably used an NR/SBR blend rubber comprising SBR which contains styrene and can easily provide desired hardness. As the rubber polymer to be used as the second rubber compound (for sliding rubber portion) there is preferably used an NR/BR blend rubber comprising BR which exhibits high elastic modulus, low exothermic properties and good abrasion resistance. The blending ratio of NR to SBR is 30/70 or more, preferably from 70/30 to 90/10. The blending ratio of NR to BR is 30/70 or more, preferably from 40/60 to 60/40.

(2) In the present invention, the first rubber compound exhibits vulcanizability (JIS K 6300: curastometer) satisfying the following requirements:

$t_{90}$(90% vulcanizing time)$-t_{50}$(50% vulcanizing time)$\geq 1.5$ min and contains a crosslinking tackifier.

(i) The adjustment of vulcanizability is normally accomplished by the combination of the kind and added amount of vulcanization accelerators. Examples of the vulcanization accelerators employable herein include guanidines, thioreas, thiazoles, sulfenamides, thiurams, dithiocarbaminates, and xanthogenates.

Figure 6:
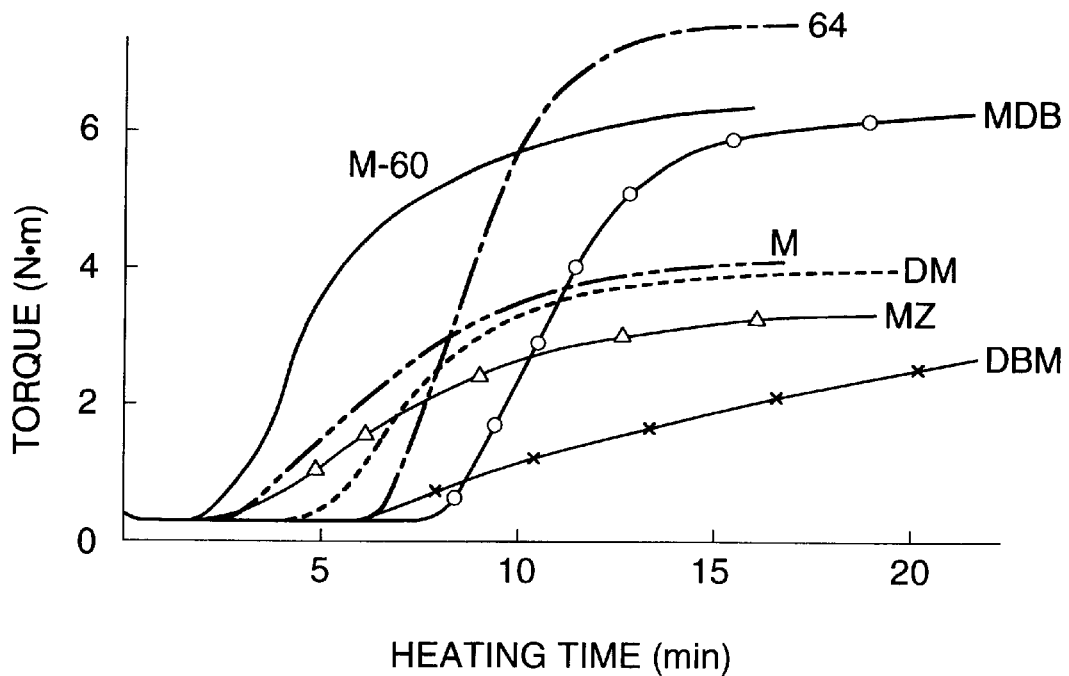
FIG. 6 is a graph illustrating the vulcanized torque curve of various thiazoles.
Figure 7:
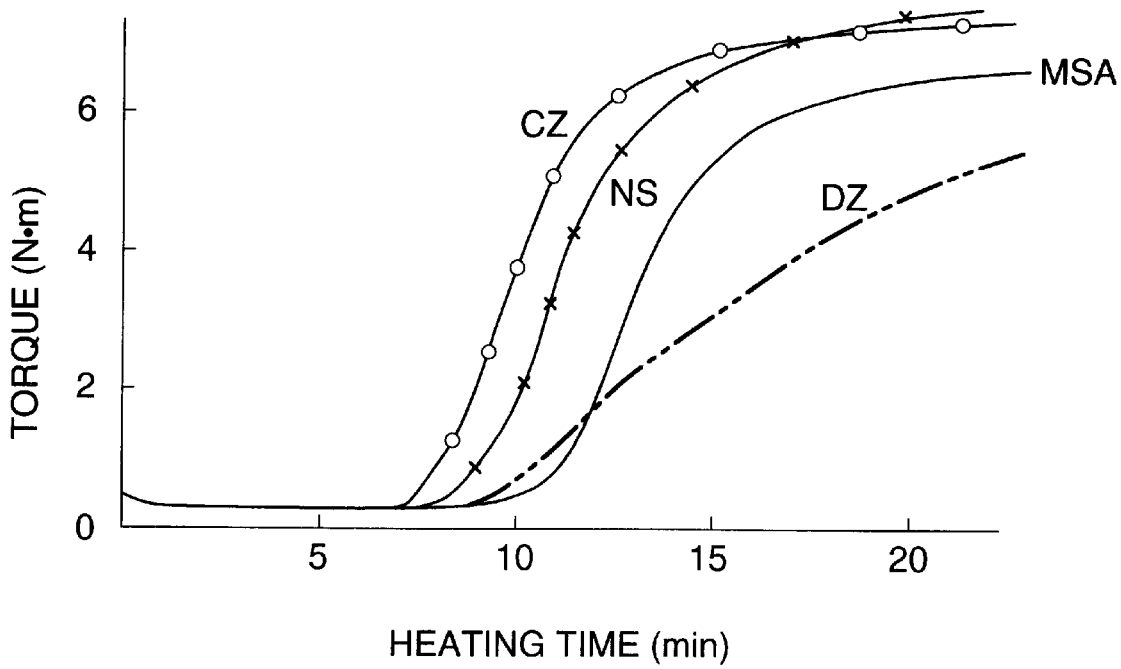
FIG. 7 is a graph illustrating the vulcanized torque curve of various sulfenamide.

For example, if as a rubber polymer there is used an NR polymer, a vulcanization accelerator consisting of or mainly composed of a benzothiazole sulfide compound (benzothiazole-2-thio compound: thiazoles in a broad sense) which is often used therefor. This is because there are various vulcanization torque curves (rheometer: 140° C.) as shown in FIGS. 6 (thiazoles) and 7 (sulfenamides). FIGS. 6 and 7 are cited from FIGS. 3.13 and 3.14 on page 78 in "Shin Gomu Gijutsu no ABC (New ABC of rubber technology)", compiled and published by Tokai Branch of The Society of Rubber Industry of Japan, Jun. 1, 1993.

The term "benzothiazole sulfide compound" as used herein is meant to include those having a group represented by the following structural formula classified as thiazoles (excluding sulfenamides) or sulfenamides by vulcanization accelerator:

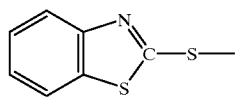

Examples of the thiazoles employable herein include mercaptobenzothiazole (M), dibenzothiazyldisulfide (DM), zinc salt of 2-mercaptobenzothiazole (MZ), 2-(2,4-dinitrophenyl)-mercaptobenzothiazole (DMB), cyclohexylamine salt of 2-mercaptobenzothiazole (M-60), N,N-diethyl-thiocarbamoyl-2-benzothiazolylsulfide (64), 2-(4-morpholinodithio)-benzothiazole (MDB) and the like.

Examples of the sulfenamides employable herein include cyclohexyl-benzothiazylsulfenamide (CZ), N-oxydiethylene-2-benzothiazolesulfenamide (MSA), N-tert-butyl-2-benzothiazolesulfenamide (NS), N,N-diisopropyl-2-benzothiazolesulfenamide (PSA), N,N-dicyclohexyl-2-benzothiazolesulfenamide (DZ) and the like.

Particularly preferred among these thiazoles are those containing mercaptobenzothiazole (M), dibenzothiazyldisulfide (DM), zinc salt of di(2-mercaptobenzothiazole) (MZ) and the like which show a slow rising of vulcanization. Particularly preferred among these sulfenamides are those containing N,N-dicyclohexyl-2-benzothiazolesulfenamide (DZ) and the like which show a slow rising of vulcanization.

The amount of the vulcanization accelerator to be incorporated depends on the predetermined vulcanizability but is normally from 1 to 3 phr.

(ii) As the foregoing crosslinking tackifier there may be used a general-purpose tackifier mixed with a vulcanizing agent (diene-based co-vulcanizing agent) so far as it doesn't exert a vulcanizing effect during kneading. In particular, an tackifier which exerts a crosslinking effect itself (e.g., phenol-formaldehyde resin) or an tackifier comprising sulfur bonded thereto (phenolpolysulfide resin) may be used to advantage.

As the tackifiers there may be exemplified the following compounds (cited from "Kagaku Binran Ouyouhen Kaitei 3-han (Handbook of Chemistry, Application-3rd Revision)", The Chemical Society of Japan, Maruzen, page 949).

[1] Coumarone resin-based tackifier: coumarone-indene resin, coumarone resin-naphthene-based oil-phenol resin-rosin mixture

[2] Phenol-terpene-based resin: phenol-formaldehyde resin, p-t-butylphenol-acetylene resin, terpene-phenol resin, polyterpene resin and the like.

[3] Petroleum-based hydrocarbon resin: synthetic polyterpene resin, aromatic hydrocarbon resin, aliphatic hydrocarbon resin and the like.

[4] Rosin derivative: rosin-pentaerythritol-ester, hydrogenated rosin, high melting ester resin and the like.

[5] Others: terpene-based tackifier, mixture of aliphatic acid and amine resin soap, co-condensation product of synthetic resin and phthalic acid ester.

To such a tackifier is then bonded (normally chemically bonded) the following diene-based rubber vulcanizing agent to produce a crosslinking tackifier. Examples of the vulcanizing agent employable herein include sulfur, thiuram, quinoid. Preferred among these vulcanizing agents are sulfur and thiuram from the physical standpoint of view.

In the case where as a rubber polymer there is used a nonpolar rubber polymer such as NR-based polymer and SBR-based polymer, a tackifier comprising as a base an alkylphenol having a higher alkyl group (normally having from 6 to 12 carbon atoms) incorporated therein as a phenol to having an improved compatibility with the nonpolar rubber polymer is used. In particular, an alkylphenol-halogenated (chlorinated) sulfur condensate (alkylphenol polysulfide resin) represented by the following structural formula can be preferably used.

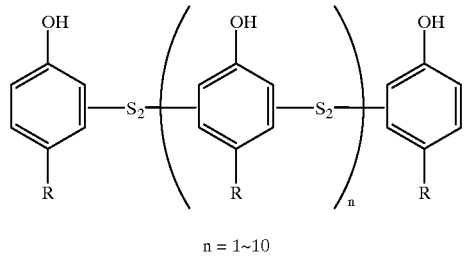

$n = 1 \sim 10$

Among the foregoing tackifiers, the phenol-formaldehyde resin can be used as a resin vulcanizing agent itself and thus doesn't need to have a vulcanizing agent such as sulfur bonded thereto. However, for resin vulcanization, a halogenated phenol-formaldehyde resin provides improvement of physical properties of vulcanized rubber to advantage. In particular, a halogenated (chlorinated) alkylphenol-formaldehyde resin represented by the following structural formula can be preferably used.

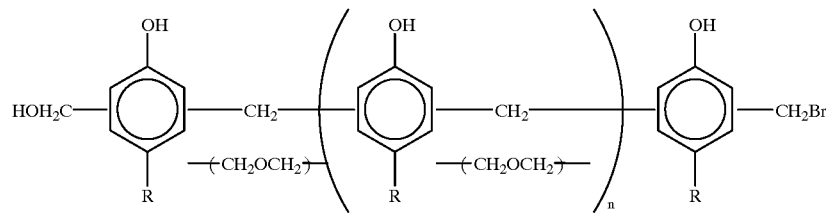

The amount of the crosslinking tackifier to be incorporated depends on the kind of the rubber polymer to be used as main body rubber portion/sliding rubber portion and the kind of the crosslinking tackifier to be used (mostly the difference in crosslinking reactivity and crosslinking reaction site density). For example, in the case where the rubber polymer for both the main body rubber portion and sliding rubber portion are NR-based rubber polymers and the crosslinking tackifier to be used is an alkylphenol polysulfide resin, the amount of the crosslinking tackifier to be incorporated is normally from 0.25 to 5 phr, preferably from 0.5 to 2.5 phr. In the case where the crosslinking tackifier to be used is an alkylphenol-formaldehyde resin, the amount of the crosslinking tackifier to be incorporated is normally from 1 to 8 phr, preferably from 2 to 6 phr.

When the amount of the crosslinking tackifier to be incorporated is too small, the effect of the invention (effect if securing the desired vulcanized adhesivity of the sliding rubber portion to the main body rubber portion after the passage of $t_{90}$ can hardly be exerted. On the contrary, when the amount of the crosslinking tackifier to be incorporated is too great, the main body rubber portion becomes too adhesive and exhibits a deteriorated permanent compression set (CS). In particular, a sulfur-providing phenol polysulfide can easily cause a drop of permanent compression set. The reason is presumably because the presence of phenol polysulfide causes a drop of ratio of monosulfide-disulfide crosslink which makes contributions to the improvement of permanent compression set.

(3) The first rubber compound in the foregoing structure comprises ordinary subsidiary materials such as zinc oxide, stearic acid, carbon black and aging inhibitor incorporated therein in addition to the foregoing vulcanizing agent, vulcanization accelerator and crosslinking tackifier. The formulation of the first rubber compound is such that the rubber hardness Hs (A) (JIS K 6301) is from 60 to 95, preferably from 65 to 85 (adjusted by the amount of vulcanizing agent and carbon black to be used) from the standpoint of securing of retention of bar by bushing. When the rubber hardness is too high, desired vibration absorption properties required for bushing can hardly be secured.

On the other hand, the second rubber compound comprises a rubber polymer as a base rubber having a vulcanizing agent, a vulcanization accelerator, zinc oxide, stearic acid, carbon black, aging inhibitor and process oil as well as a lubricant for providing high sliding properties incorporated therein. As the lubricant there maybe used a higher aliphatic acid amide, polyethylene-paraffin wax, aliphatic acid ester (excluding aliphatic acid amide), dimethyl polysiloxane, etc., singly or in combination of two or more thereof. Preferred among these lubricants is higher aliphatic acid amide from the standpoint of maintenance of bloom. The higher amide to be incorporated in the base rubber of rubber with high sliding properties blooms from the base rubber during use to act as a lubricant and hence improve the sliding properties. The amount of the aliphatic acid amide to be incorporated is from 5 to 40 phr, preferably from 10 to 35 phr. When the amount of the higher aliphatic acid amide to be incorporated is too small, sufficient sliding properties can hardly be provided. On the contrary, when the amount of the higher aliphatic acid amide to be incorporated is too great, the vulcanized adhesivity on the interface of the main body rubber portion with the sliding rubber portion can be adversely affected, and the physical properties (particularly rubber strength) of vulcanized rubber can be adversely affected. Examples of the higher aliphatic acid amide which can be preferably used herein include saturated aliphatic acid amide such as palmitic acid amide (C16) and stearic acid amide (C18), and unsaturated aliphatic acid amide such as such as oleic acid amide (C18) and erucic acid amide (C22). The amount of the higher aliphatic acid amide to be incorporated in the inner layer rubber 1A as the foregoing sliding rubber portion is preferably the value required when the rubber elastic member 1 is made of rubber with high sliding properties alone. When the amount of the higher aliphatic acid amide to be kneaded in the inner layer rubber 1A is too great, the rubber physical properties can be adversely affected. In general, the amount of the higher aliphatic acid amide to be incorporated in the base rubber is predetermined to be from about 5 to 30% by weight. When the amount of the higher aliphatic acid amide to be incorporated is too great, excessive higher aliphatic acid amide can be previously kneaded in the outer layer rubber 1B as the foregoing main body rubber portion.

The rubber with high sliding properties comprises the foregoing base rubber and higher aliphatic acid amide incorporated therein at a predetermined ratio. The rubber with high sliding properties may further comprise ordinary known additives such as vulcanizing agent, vulcanization accelerator, vulcanizing aid and processing aid incorporated therein. Examples of the vulcanizing agent employable herein include sulfur, peroxide, metal oxide, and polyamine. The amount of the vulcanizing agent to be used is normally from 0.1 to 10% by weight. Examples of the vulcanization accelerator employable herein include sulfenamide-based vulcanization accelerator, thiazole-based vulcanization accelerator, thiuram-based vulcanization accelerator, guanidine-based vulcanization accelerator, dithiocarbminate, and xanthogenate. The vulcanization accelerator is normally used in an amount of from 0.1 to 10% by weight. As the vulcanizing aid there is normally used zinc oxide or the like. The amount of such a vulcanizing aid to be incorporated is normally from 3 to 15% by weight. As the processing aid there may be used an aliphatic acid such as stearic acid or fatty oil.

The outer layer rubber 1B is formed by the same base rubber as used for inner layer rubber 1A or rubber material similar to that of inner layer rubber 1A. In the case where as the base rubber of inner layer rubber 1A there is used a blend of natural rubber and butadiene rubber (NR/BR), a natural rubber (NR), a butadiene rubber (BR) or a blend of natural rubber and butadiene rubber (NR/BR) may be used to improve the adhesivity between the two layers. In particular, the foregoing outer layer rubber 1B may be formed by a natural rubber-based material to enhance the fatigue resistance and durability to advantage.

When the hardness of the outer layer rubber 1B is equal to or more than that of the inner layer rubber 1A, the rigidity of the entire rubber elastic member 1 is enhanced to advantage. In general, the formulation of the outer layer rubber 1B is preferably predetermined in such a manner that the difference of the hardness between the inner layer rubber 1A and the outer layer rubber 1B is from Δ10 to Δ20 namely the hardness Hs of the outer layer rubber 1B (JIS K 6301) is from 40 to 85, preferably 45 to 75 (adjusted by the amount of vulcanizing agent, carbon black, etc.). When the rubber hardness is too low, there can easily occur a problem with the durability of the bushing (particularly abrasion, etc.). On the contrary, when the difference in rubber hardness is too great, a higher vulcanized adhesivity is required. The rubber with high sliding properties allows the higher aliphatic acid amide to bloom from the interior thereof during the use of the stabilizer bushing to provide sliding properties. In some combinations of inner layer rubber 1A and outer layer rubber 1B, the higher aliphatic acid amide which has thus bloomed can migrate towards the outer layer rubber 1B. In this case, too, by enhancing the rigidity of the entire rubber elastic member and the flange 11, the stabilizer bushing can be prevented from making a horizontal shift from the bracket.

In order to prepare a stabilizer bushing having the foregoing arrangement, a process may be normally used which comprises forming an outer layer rubber 1B, subjecting the outer layer rubber 1B to vulcanization or semi-vulcanization, injecting a rubber with high sliding properties which becomes an inner layer rubber 1A and a sliding surface 12 into the mold, and then subjecting the rubber to vulcanization. The present invention is not limited to this process Alternatively, a process may be used which comprises previously molding respective rubber materials into predetermined shapes, and then bonding the molded parts to each other. Other processes may be used.

Figure 13:
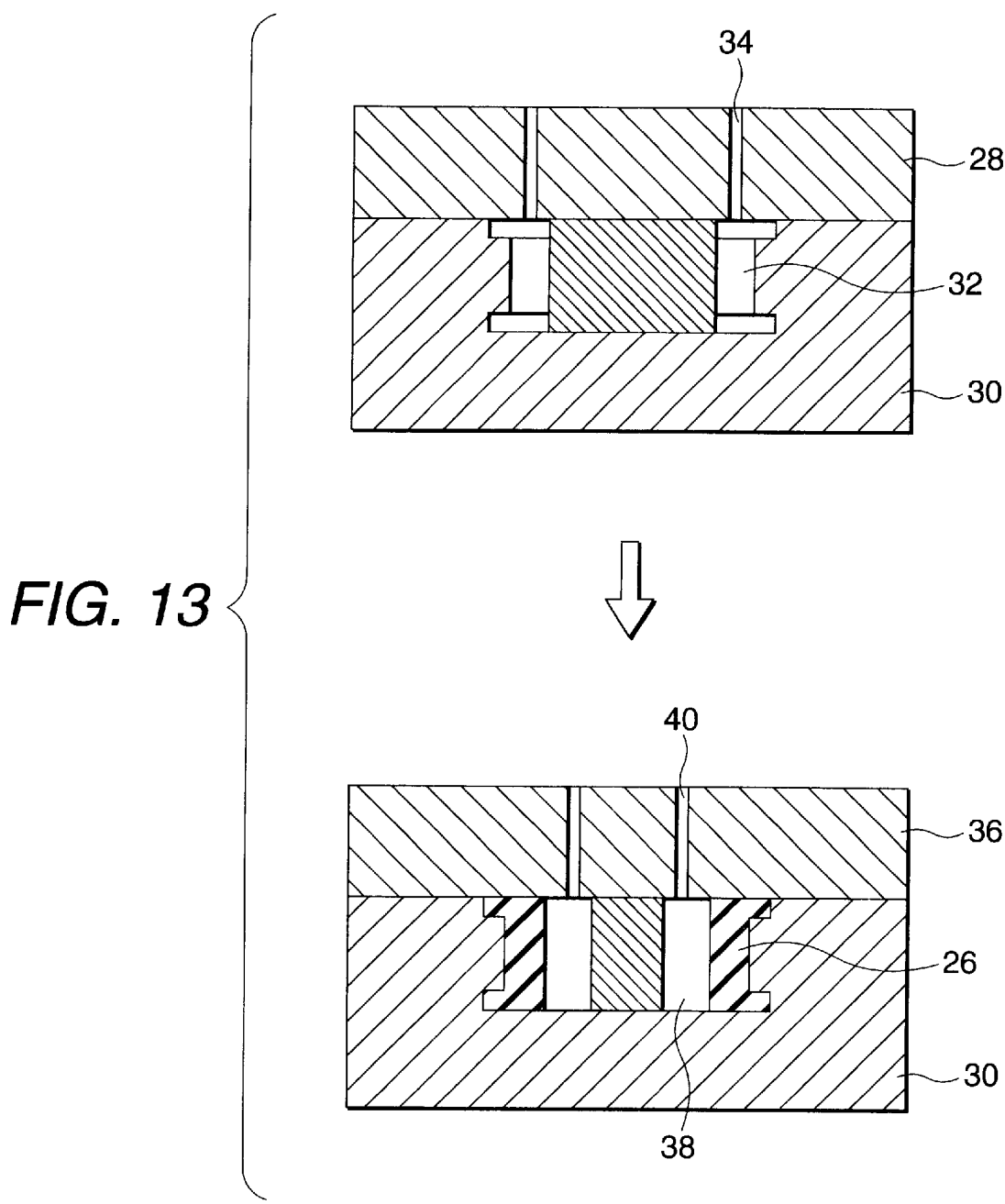
FIG. 13 illustrates a schematic sectional view of various molds at the process for the preparation of the stabilizer bushing of FIG. 2.

(4) An embodiment of the process for the preparation of the stabilizer bushing of the invention will be described hereinafter. In order to form a bushing from the foregoing various compounds, a mold as shown in FIG. 13 may be used as mentioned above.

In other words, an outer layer rubber 1B is formed by a first rubber compound. An inner layer rubber 1A is formed of a second rubber compound on the inner side of the outer layer rubber 1B. The inner layer rubber 1a is then co-crosslinked to the outer layer rubber 1B to prepare a bushing as shown in FIGS. 2A to 5.

The thickness of the inner layer rubber thus formed depends on the kind of bushing. For example, when the bushing has an outer diameter of 26 mm and an inner diameter of 19 mm, the thickness of the inner layer rubber is from 3 to 4 mm. When the thickness of the inner layer rubber is too small, the durability (life) of the lubricant is deteriorated. On the contrary, when the thickness of the inner layer rubber is too great, the spring constant of the bushing is deteriorated.

The molding conditions are as follows.

The injection molding of the outer layer rubber 1B is effected at an injection material temperature of from 150° C. to 170° C. for a die close time (90% vulcanization time) of from 1.5 to 3.0 min.

Subsequently, the top force is replaced by another top force. The injection molding of the inner layer rubber 1A is effected at an injection material temperature of from 150° C. to 170° C. for a die close time (90% vulcanization time) of from 1.5 to 3.0 min.

The bushing thus formed has a sufficient crosslinked adhesive strength between the outer layer rubber and the inner rubber layer and shows no deformation of the main body rubber portion as shown in the test examples described later.

In accordance with the foregoing constitution, the rubber elastic member 1 comprises a sliding surface 12 made of a rubber with high sliding properties provided at the end face facing the horizontal shift stopper 2, and the area of the sliding surface 12 is greater than that of the horizontal shift stopper 2. In this arrangement, even when the stabilizer bar S makes a horizontal shift to cause the rubber elastic member 1 and the horizontal shift stopper 2 to come in contact with each other, the frictional resistance with respect to each other is so extremely small that no abnormal noise is generated. Since the sliding surface 12 can be formed integrally with the inner layer rubber 1A made of a rubber with high sliding properties, it can be easily prepared. Since the inner layer rubber 1A is made of a rubber with high sliding properties, the sliding resistance with respect to the stabilizer bar S is lowered to improve the riding comfort. In this arrangement, the generation of abnormal noise accompanying the relative rotation can be prevented. On the other hand, since the outer layer rubber 1B is made of a natural rubber-based material having a high hardness, the rigidity can be enhanced to provide an improved stability in operation and an excellent durability. Further, since the inner layer rubber 1A is made of the same rubber material as that of the outer layer rubber 1B, and the external shape of the inner layer 1A is a polygon, the resulting adhesivity is enhanced.

Figure 2A:
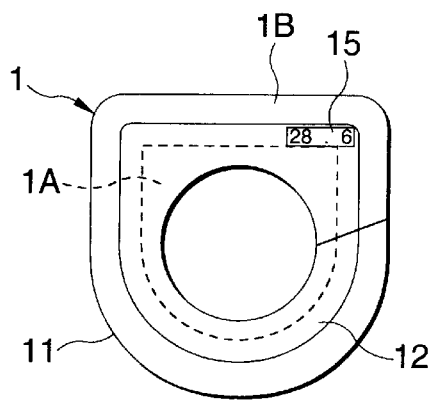
Figure 2B:
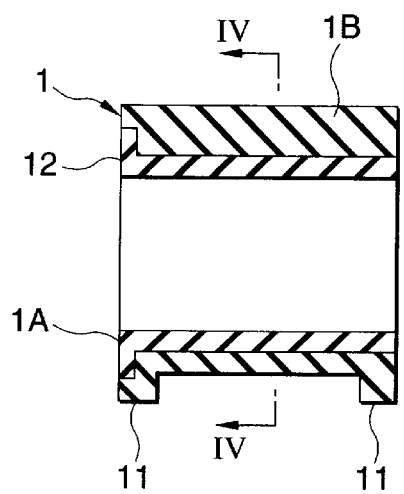
Figure 2C:
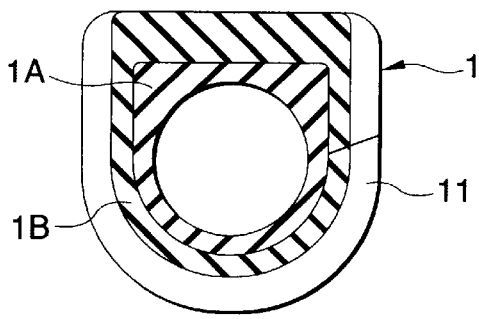

FIGS. 2A to 2C each illustrate a second embodiment of implication of the present invention. In the foregoing first embodiment of implication of the present invention, the entire end face of the rubber elastic member 1 acts as a sliding surface 12. However, if the size of the horizontal shift stopper 2 is relatively small, the sliding surface 12 can be formed on a part of the end face of the rubber elastic member 1. In the present embodiment, the sliding surface 12 has the same shape as that of the end face (shown front in FIG. 2A, shown left in FIG. 2B) of the rubber elastic member 1 on which it is provided but has a size smaller than that of the rubber elastic member 1. However, it is preferred that the sliding surface 12 have a larger area than that of the horizontal shift stopper 2 so that the horizontal shift stopper 2 is not brought into contact with the surface surrounding the sliding surface 12.

In the foregoing first embodiment, the inner layer rubber 1A has a polygonal external shape. In the present embodiment, the inner layer rubber 1A has the same external shape as that of the outer layer rubber 1B as shown in FIG. 2C. By thus making the external shape of the inner layer rubber 1A analogous to that of the outer layer rubber 1B, the volume of the inner layer rubber 1A can be increased more easily than the case where the inner layer rubber 1A has a circular or polygonal section, making it possible to increase the total content of lubricant in the rubber to advantage from the standpoint of sliding properties. Further, since the inner layer rubber 1B has a shape having rectangles, it has the same effect of preventing shift or rotation as in the foregoing first embodiment.

The foregoing constitution, too, can exert-a similar effect of preventing the interference with the horizontal shift stopper 2. Since the outer layer rubber 1B is provided surrounding the periphery of the sliding surface 12, the resulting formability is good. Further, since the inner layer rubber 1A has an external shape having rectangles, it has the same effect of preventing shift or rotation as in the foregoing first embodiment. Moreover, the sliding surface 12 has the same shape as that of the end face of the rubber elastic member 1, and a portion which doesn't come in contact with the circular horizontal shift stopper 2 is formed on the left and right ends of the top side of the sliding surface 12. Thus, by providing an identification marking 15 at the top right side or the like as shown in FIG. 2A, the interference with the horizontal shift stopper 2 can be prevented.

In the foregoing various embodiments, the sliding surface 12 is provided only at one end face of the rubber elastic member 1. However, the sliding surface 12 may be provided at the both end faces of the rubber elastic member 1. An example of this arrangement will be described hereinafter as a third embodiment of implication of the present invention.

Figure 3A:
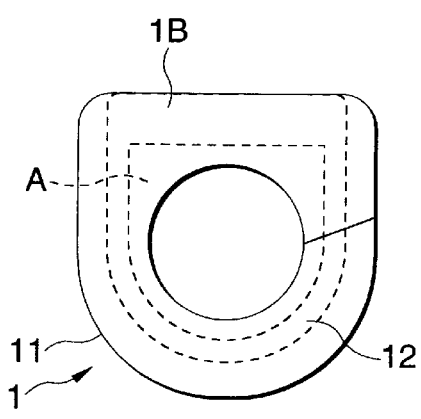
Figure 3B:
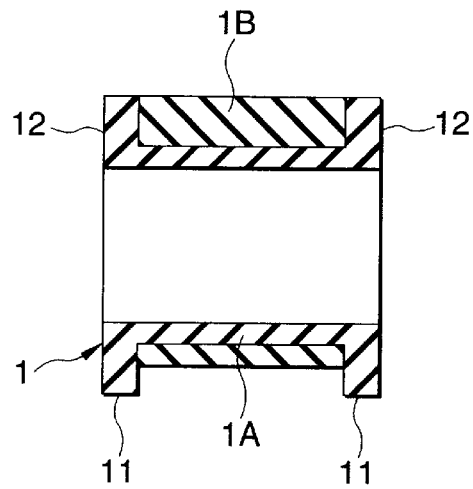

As shown in FIGS. 3A and 3B, in the present embodiment, the rubber elastic member 1 is formed by a rubber with high sliding properties integrally with the inner layer rubber 1A over the portion ranging from the left and right end faces to the thickness of the flange portion 11. In other words, the entire end faces of the rubber elastic member 1 act as a sliding surface 12. In this arrangement, the outer layer rubber 1B can be securely kept interposed between the two flange portions 11 to enhance the adhesivity between the inner and outer layers, making it possible to prevent the inner and outer layers from shifting or coming off from each other even if they are not bonded.

Figure 4A:
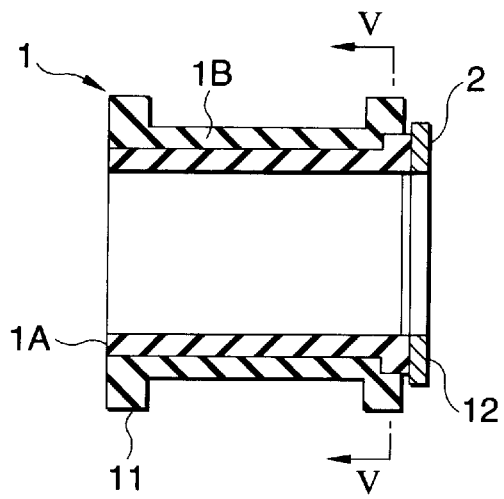
Figure 4B:
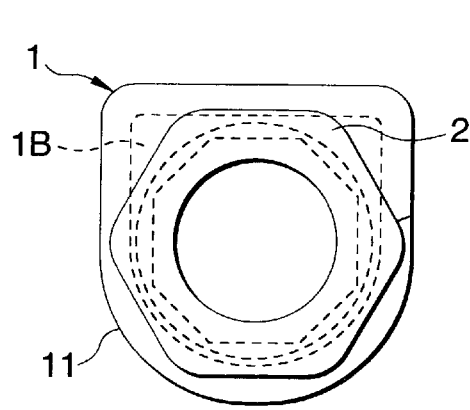
Figure 4C:
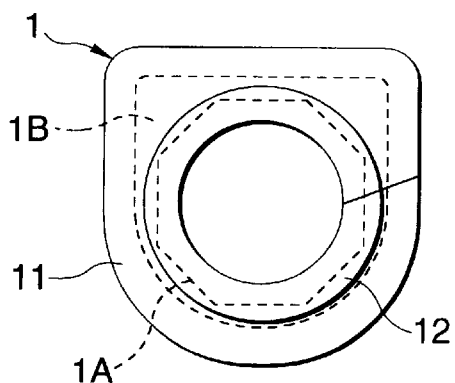
Figure 4D:
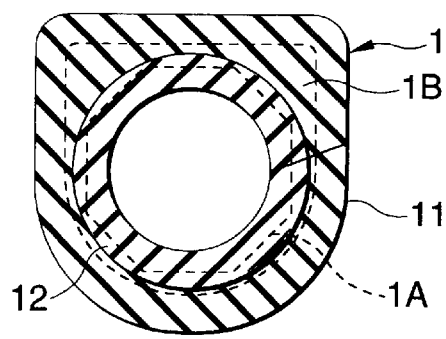

FIGS. 4A to 4D each illustrate a fourth embodiment of implication of the present invention. In the present embodiment, the rubber elastic member 1 comprises a sliding surface 12 made of a rubber with high sliding properties provided on a part of one end face thereof (shown right on the drawings) (FIGS. 4C and 4D), and the sliding surface 12 protrudes somewhat from the outer layer rubber 1B (FIG. 4A) The horizontal shift stopper 2 facing the sliding surface 12 has a shape of polygon such as hexagon and is formed slightly larger than the sliding surface 12 as shown in FIG. 4B. The sliding surface 12 is circular, and the inner layer rubber 1A has an external shape of polygon such as octagon.

In the case where the prevention of the rubber elastic member 1 from coming off from the bracket 3 is considered important, it is preferred that the size of the sliding surface 12 be reduced so that the rubber with high sliding properties doesn't cover the flange portion 11 for the purpose of securing the desired rigidity of the flange portion 11. In this arrangement, the foregoing constitution can be made effective. In particular, since the sliding surface 12 protrudes, the horizontal shift stopper 2 doesn't come in contact with the outer layer rubber 1B, making it possible to attain both the prevention of interference with the horizontal shift stopper 2 and the improvement of rigidity.

Figure 5:
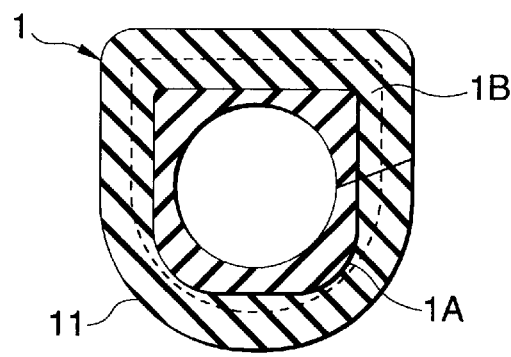
FIG. 5 is a sectional view of a stabilizer bushing illustrating a fifth embodiment of implication of the present invention taken on the line perpendicular to the axial direction.

FIG. 5 illustrates a fifth embodiment of implication of the present invention. In the present embodiment, the sliding surface 12 has a substantially rectangular external shape and with such an extent of area that it doesn't cover the flange portion 11. When the sliding surface 12 is smaller than the horizontal shift stopper 2, a problem can easily arise that the concentration of stress occurs during contact. By providing the sliding surface 12 with a larger area, the concentration of stress can be relaxed. The shape and area of the sliding surface 12 can be properly changed depending on the required rigidity and other properties of the flange portion 11. Further, by graining or blast-finishing the surface of the sliding surface 12 to form a roughened surface thereon, the contact area of the sliding surface 12 with respect to the horizontal shift stopper 2 can be reduced, making it more effective to prevent the generation of abnormal noise.

Examples of test made to confirm the effect of the present invention will be described hereinafter.

First rubber compounds set forth in Table 2 having vulcanizability ($t_{90}-t_{50}$) adjusted so as to give values (min) as set forth in Table 1 were each subjected to injection molding to produce a first molded rubber (100 mm□×3.0 mmt). The kind and the amount of vulcanization accelerator were the same throughout the examples and comparative examples.

After the passage of various vulcanization times of $t_{50}$, $t_{90}$ and $t_{135}$, second rubber compounds set forth in Table 3 were each injection-molded onto the first molded rubber to produce a second molded rubber (100 mm□×3.0 mmt) so that vulcanized molding was effected. The vulcanization conditions were as follows.

Figure 8:
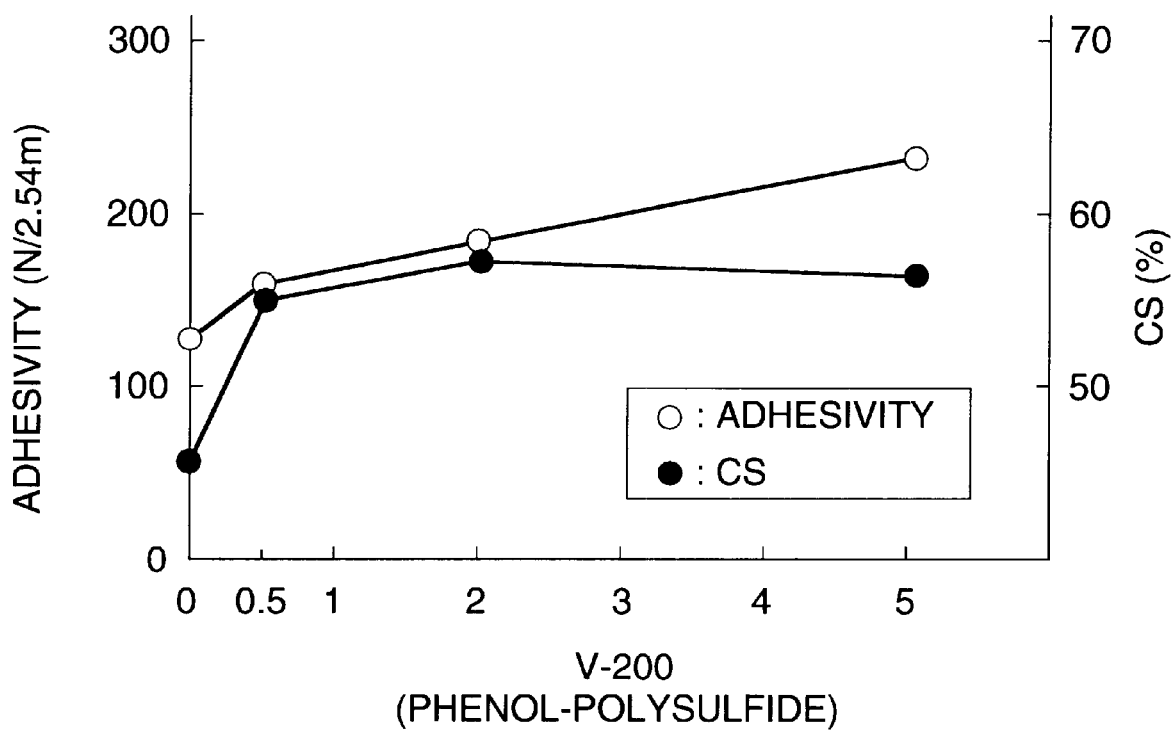
FIG. 8 is a graph illustrating the relationship between the added amount of phenol polysulfide and adhesivity and permanent compression set (CS)

Injection molding of first molded rubber . . . injection molding temperature: 160° C.; mold closing time (90% vulcanization time): 2.5 min Injection molding of second molded rubber . . . injection molding temperature: 160° C.; mold closing time (90% vulcanization time): 2.5 min The various test specimens thus obtained (rubber laminate) were each then subjected to 180° peeling test in a 80° C. atmosphere (JIS K 6301, rate of pulling: 50 mm/min) and permanent compression set test (JIS K 6301, heat treatment: 100° C.×70 hr). Table 1 and FIG. 8 showing the results of these tests give the following knowledge.

It is made obvious that the examples satisfying the requirements of the invention show a good adhesive strength (fracture of rubber: R) even if the second molded rubber is formed after the passage of $t_{90}$.

In particular, Example 2, which involves the use of a thiazole-based material containing DM and phenol polysulfide as a crosslinking tackifier, shows a good adhesive strength even if the second molded rubber is formed after the passage of $t_{90}$.

The reason why Examples 1 to 3 and Examples 4 and 5 have vulcanizability ($t_{90}-t_{50}$) different from that of Comparative Example 2 and Comparative Example 1, respectively, although the kind (thiazole-based vulcanization accelerator is for the former; sulfenamide-based vulcanization accelerator is for the latter) and amount of vulcanization accelerator is the same is presumably because the crosslinking tackifier incorporated exerts an effect of retarding vulcanization. The reason why Examples 1 to 3 show no change of vulcanizability although the amount of the crosslinking tackifier is increased is presumably because even the incorporation of a small amount (0.5 phr) of a crosslinking tackifier causes the effect of retarding vulcanization to reach saturation.

Figure 9:
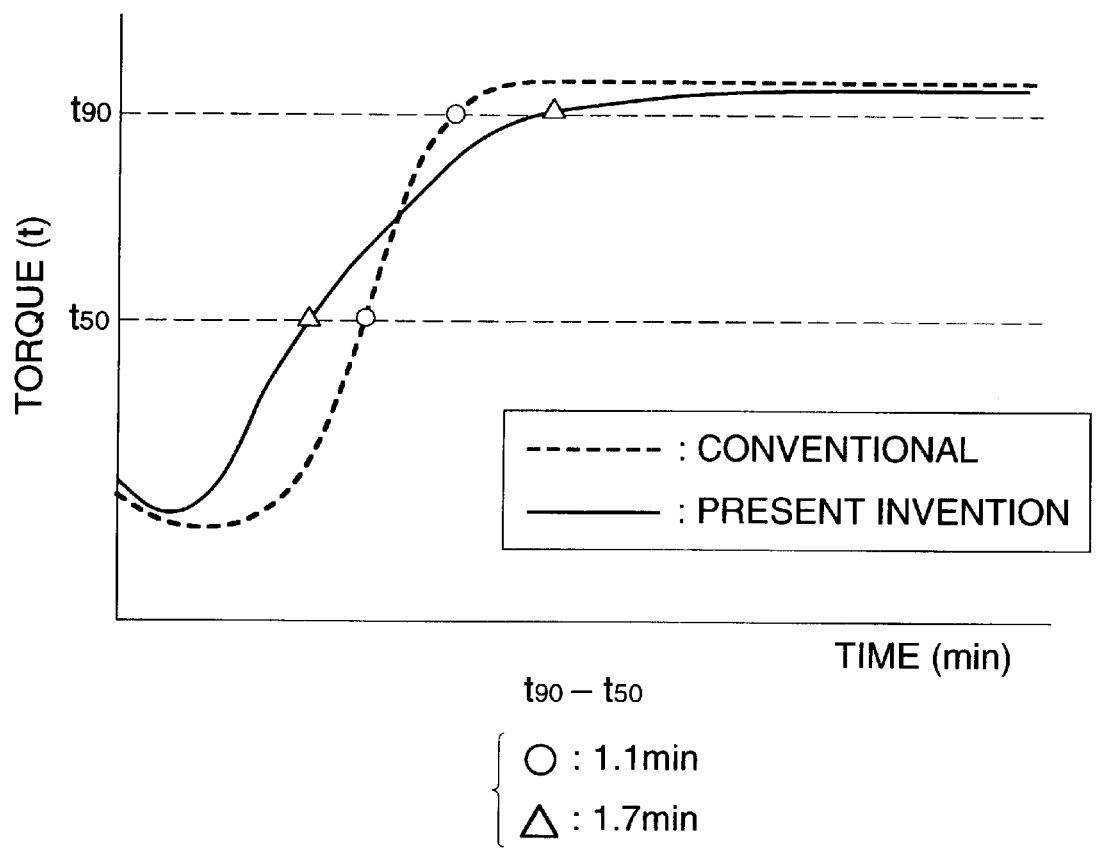
FIG. 9 is a graph typically illustrating the vulcanized torque curve in the present invention (Example 1) and prior art (Comparative Example 1)
Figure 10:
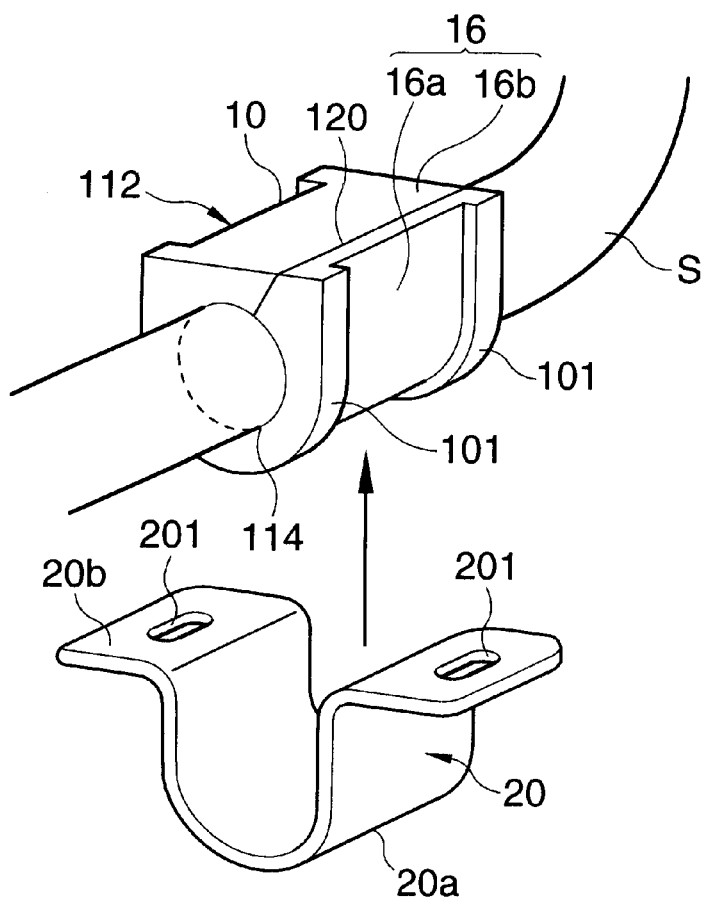
FIG. 10 is a perspective view illustrating how a conventional stabilizer bushing is mounted on a stabilizer bar.
Figure 11:
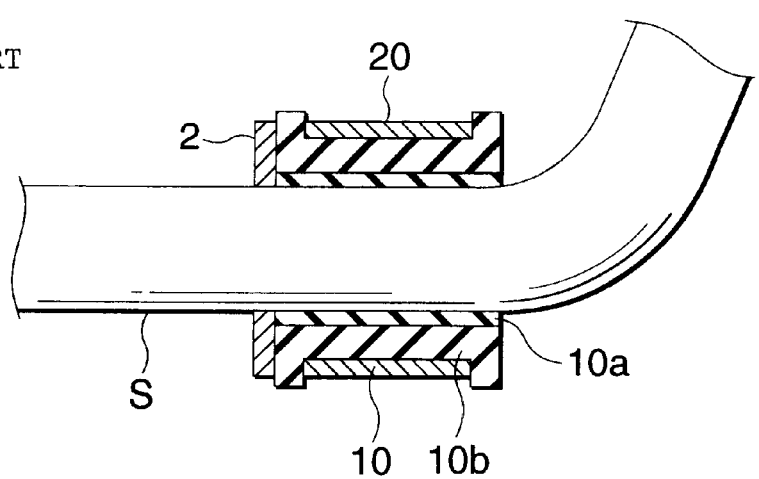
FIG. 11 is a sectional view illustrating how a conventional stabilizer bushing is mounted on a stabilizer bar.
Figure 12:
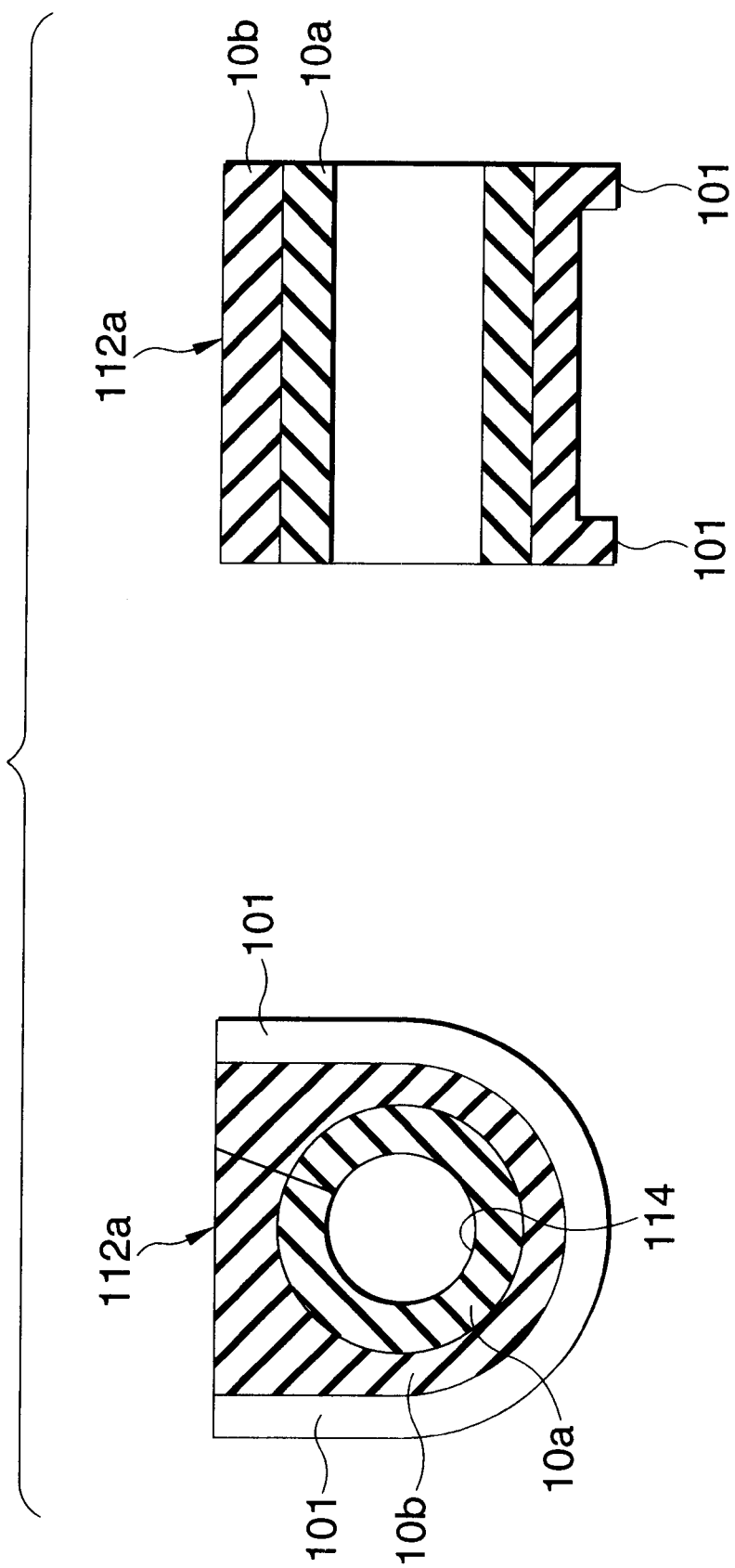
FIG. 12 illustrates a transverse sectional view and longitudinal sectional view of a conventional stabilizer bushing.

FIG. 9 typically illustrates the vulcanizability curve of Example 2 (present invention) and Comparative Example 1 (conventional).

TABLE 1

| | Example 1 | Example 2 | Example 3 | Example 4 | Example 5 | Comparative Example 1 | Comparative Example 2 |
|---|---|---|---|---|---|---|---|
| $t_{90} - t_{50}$ (min) | 1.76 | 1.76 | 1.76 | 1.71 | 1.86 | 1.1 | 1.28 |
| Crosslinking | *1) | ← | ← | ← | *2) | — | — |
| tackifier (phr) | 0.5 | 2 | 5 | 2 | 4 | | |
| Vulcanization accelerator | Thiazole-based | ← | ← | Sulfenamide-based | ← | ← | Thiazole-based |
| Adhesivity $t_{50}$ (min) | — | 150 (R) | — | 149 (R) | 155 (R) | 160 (R) | 152 (R) |
| $t_{90}$ (min) | 140 (R) | 168 (R) | 160 (R) | 130 (R) | 120 (R) | 19 | 65 |

TABLE 1-continued

|  | Example 1 | Example 2 | Example 3 | Example 4 | Example 5 | Comparative Example 1 | Comparative Example 2 |
|---|---|---|---|---|---|---|---|
| $t_{135}$ (min) | — | 160 (R) | — | 22 | 23 | 18 | 14 |
| CS (%) 100° C. × 70 hr | 55 | 56 | 62 | 58 | 57 | 57 | 54 |

*1) SMIFINE V-200 (phenol-polysulfide resin), produced by TAOKA CHEMICAL INDUSTRIAL CO., LTD.
*2) TACKIROLL 250 (bromated phenol resin), produced by TAOKA CHEMICAL INDUSTRIAL CO., LTD.

TABLE 2

<First rubber compound>

|  | Example 1 | Example 2 | Example 3 | Example 4 | Example 5 | Comparative Example 1 | Comparative Example 2 |
|---|---|---|---|---|---|---|---|
| NR | 80 | 80 | 80 | 80 | 80 | 80 | 80 |
| SBR | 20 | 20 | 20 | 20 | 20 | 20 | 20 |
| Stearic acid | 1 | 1 | 1 | 1 | 1 | 1 | 1 |
| Zinc oxide | 5 | 5 | 5 | 5 | 5 | 5 | 5 |
| Carbon black | 45 | 45 | 45 | 45 | 45 | 45 | 45 |
| Aging inhibitor | 3 | 3 | 3 | 3 | 3 | 3 | 3 |
| Phenol-polysulfide resin | 0.5 | 2 | 5 | 2 |  |  |  |
| Bromated phenol resin |  |  |  |  | 4 |  |  |
| Sulfur | 2 | 2 | 2 | 2 | 2 | 2 | 2 |
| NOCCELER CZ*1) |  |  |  | 1.5 | 1.5 | 1.5 |  |
| NOCCELER CM*1) | 1 | 1 | 1 |  |  |  | 1 |
| NOCCELER EP-60*1) | 2 | 2 | 2 |  |  |  | 2 |

*1)OUCHI SHINKO CHEMICAL INDUSTRIAL CO., LTD.

TABLE 3

<Second rubber compound>

| NR | 50 |
|---|---|
| BR | 50 |
| Stearic acid | 1 |
| Zinc white | 5 |
| Process oil | 25 |
| Carbon black | 75 |
| Aging inhibitor | 3 |
| Oleic acid amide | 30 |
| Sulfur | 3 |
| NOCCELER CZ | 3 |

What is claimed is:

1. A stabilizer bushing comprising:
a stabilizer bar;
a cylindrically-formed rubber elastic member allowing said stabilizer bar to be inserted and retained, and having a laminated structure comprising an inner layer rubber made of a rubber with high sliding properties and an outer layer rubber provided on the outside of said inner layer rubber;
a bracket retaining an outer periphery of said rubber elastic member so as to attach said rubber elastic member to a body member;
a stopper member provided around said stabilizer bar for regulating the axial movement of said rubber elastic member;
wherein, a sliding surface made of a rubber with high sliding properties is provided on at least a predetermined area of an end face of said rubber elastic member facing said stopper member and said predetermined area of said sliding surface is equal to or more than that of the opposing end face of said stopper member.

2. A stabilizer bushing according to claim 1, wherein said sliding surface protrudes from the end face of said outer layer rubber towards said stopper member.

3. A stabilizer bushing according to claim 1, wherein said sliding surface is formed integrally with said inner layer rubber.

4. A stabilizer bushing according to claim 1, further comprising a pair of radially extending flange portions provided on the respective end face of said rubber elastic member,
wherein the entire end faces of said rubber elastic member including said flange portion are integrally formed with said inner layer by a rubber with high sliding properties.

5. A stabilizer bushing according to claim 1, wherein the hardness of said outer layer rubber is equal to or more than that of said inner layer rubber.

6. A stabilizer bushing according to claim 1, wherein the external shape of said inner layer rubber is polygon or analogous to that of said outer layer rubber.

7. A stabilizer bushing for a vehicle comprising a main body rubber portion formed of a sulfur-vulcanizable first rubber compound and a sliding rubber portion formed of a second rubber compound containing a sulfur-vulcanizable lubricant on the inner surface of said main body rubber portion, wherein said first rubber compound exhibits vulcanizability satisfying the following requirements:

$$t_{90} - t_{50} \geq 1.5 \text{ min}$$

and contains a crosslinking tackifier, $t_{90}$ is a time to 90% vulcanization, $t_{50}$ is a time to 50% vulcanization, and the vulcanizability is measured by a curastometer in accordance with JIS K 6300.

8. A stabilizer bushing for vehicle according to claim 7, wherein said crosslinking tackifier is a phenol-formaldehyde resin.

9. A stabilizer bushing for vehicle according to claim 7, wherein said crosslinking tackifier is a phenol-polysulfide resin.

10. A stabilizer bushing for vehicle according to claim 9, wherein the rubber polymer to be used as said first rubber compound is a natural rubber-based polymer and the amount of said crosslinking tackifier is from 0.25 to 5 phr when said crosslinking tackifier is incorporated an alkylphenol-polysulfide resin.

11. A stabilizer bushing for vehicle according to claim 7, wherein the rubber polymer to be used as said first rubber compound and second rubber compound is an NR-based rubber polymer and the vulcanization accelerator to be incorporated in said first rubber compound is a benzothiazole sulfide compound.

12. A process for the preparation of a stabilizer bushing, comprising:

forming a main body rubber portion from a sulfur-vulcanizable first rubber compound;

forming a sliding rubber portion from a second rubber compound containing a sulfur-vulcanizable lubricant on the inner side of said main body rubber portion after the passage of 90% of the vulcanization time for said main body rubber portion; and crosslinking said sliding rubber portion to said main body rubber portion;

wherein said first rubber compound exhibits vulcanizability satisfy the following requirements:

$$t_{90} - t_{50} \geq 1.5 \text{ min}$$

and contains a crosslinking tackifier, $t_{90}$ is a time to 90% vulcanization, $t_{50}$ is a time to 50% vulcanization, and the vulcanizability is measured by a curastometer in accordance with JIS K 6300 .

* * * * *